Jan. 14, 1947.  J. B. O'CONNOR  2,414,270
FASTENER DEVICE MOUNTING MEANS
Filed April 24, 1944
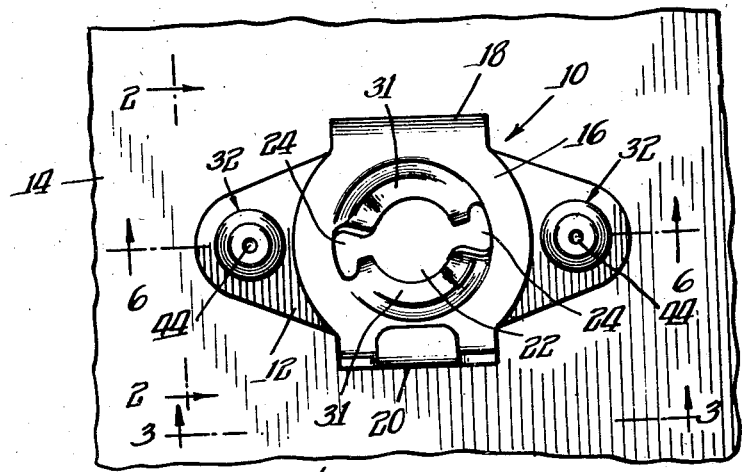
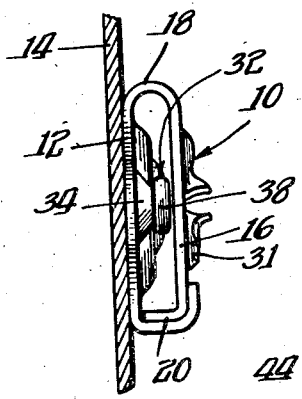
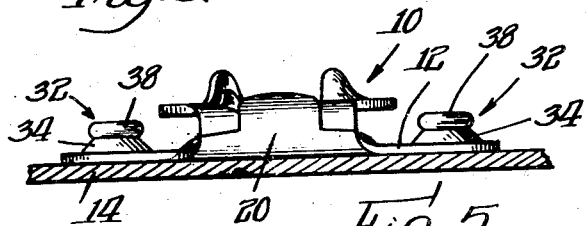
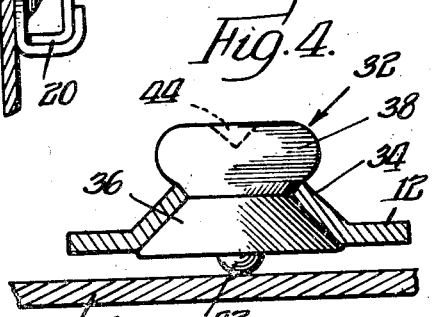
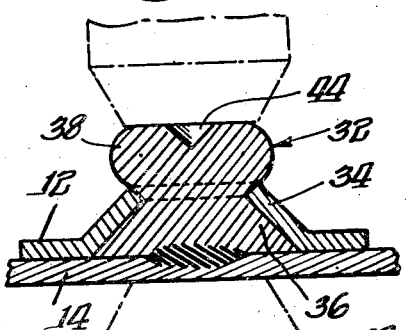
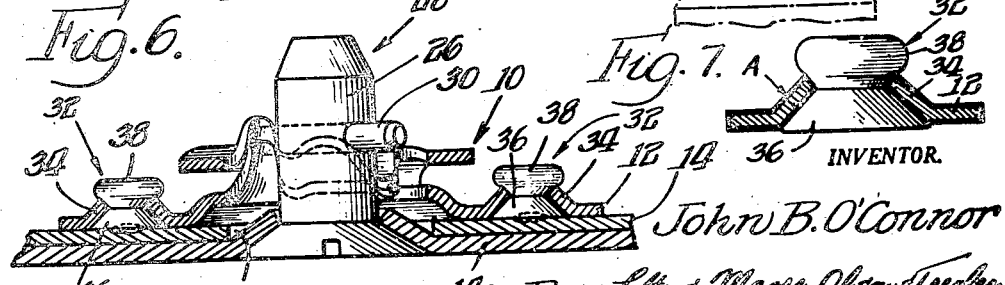
INVENTOR.
John B. O'Connor Patented Jan. 14, 1947

2,414,270

UNITED STATES PATENT OFFICE 2,414,270

FASTENER DEVICE MOUNTING MEANS

John B. O'Connor, Evanston, Ill., assignor to Illinois Tool Works, Chicago, Ill., a corporation of Illinois Application April 24, 1944, Serial No. 532,384

3 Claims. (Cl. 189—36)

The present invention relates generally to fastening devices for detachably securing together work parts such as sheet metal plates and the like.

It has heretofore been common practice to employ fasteners to enable the quick attachment and detachment of sheet metal work parts, such as the cowlings of airplanes and the like. Such fasteners include a rotary stud carried by one of the work parts, and a complementary fastener element which is riveted or otherwise secured to the other work part. In certain instances it has been found practical to secure the aforementioned complementary fastener element to the work part by welding. In instances where the stud accommodating fastener element is composed of metal which is dissimilar to the work part to which it is to be fastened, it may not be practical to employ a weld as a means of anchorage. For example, it has been found that ordinary carbon steel and stainless steel are not readily welded together directly. Not infrequently the stud accommodating fastener element is made of carbon steel whereas the work part is made of stainless steel. Also, it is common practice to plate the fastener element to protect it against corrosion and the presence of plating on the fastener makes it extremely difficult to weld it to the work part. The heat resulting from the welding operation also has a tendency to impair the plating material when a welding electrode is applied directly to the metallic plating.

It has been found extremely difficult to weld spring tempered parts to metallic surfaces without impairing the temper of the material. Therefore, one of the important objects of the present invention is to provide a stud accommodating fastener element equipped with means, in the form of a metallic insert, which will materially facilitate the welding of the fastener to a work part.

To accomplish the foregoing object, the present invention contemplates a fastener equipped with welding inserts, as for example rivet-like metallic inserts which will insure the formation of a strong weld when applied to the metallic surface of a work part.

It is a further object to provide in combination with a metallic fastener part which, because of its structural characteristics, does not readily lend itself for direct welding to a metallic surface, a welding insert, the structural characteristics are such as to render said insert readily weldable to a work surface.

More specifically, the invention contemplates fasteners of the type set forth above equipped with welding inserts carried as a unit therewith and so arranged as to facilitate drilling a hole through the welding element when it is desired to remove a fastener from the work part.

The foregoing and other objects and advantages will be more apparent from the following detailed description when considered in connection with the accompanying drawing, wherein Figure 1 is an elevational view of a stud accommodating fastener device of the type contemplated by the present invention, said fastener device being shown in association with a sheet metal work part.

Figure 2 is an end elevational view of the fastener taken substantially along the line 2—2 of Figure 1.

Figure 3 is a side elevational view taken along the line 3—3 of Figure 1.

Figure 4 is an enlarged sectional view taken centrally of one of the rivet type welding elements or inserts, the welding insert being shown in elevation, and located adjacent a work part, in position to be welded.

Figure 5 is a view similar to Figure 4, disclosing the rivet type welding insert in section after it has been welded to the work part, welding electrodes being indicated by dot and dash lines.

Figure 6 is a sectional view taken along line 6—6 of Figure 1 when the fastening device of Figure 1 is coupled with a locking stud carried by another work part; and Figure 7 is a view similar to Figure 4 disclosing the welding insert in association with a plated fastener part.

Referring now to the drawing more in detail, wherein like numerals have been employed to designate the similar parts throughout the various figures, it will be seen that one embodiment of the invention is illustrated in a fastener device designated generally by the numeral 10. This fastener device is made of sheet metal, preferably spring tempered, and is provided with a base section 12, designed to be secured upon the adjacent surface of a work part 14, as for example, a piece of sheet metal cowling or the like. In the disclosed embodiment the fastener device 10 also includes a locking section or plate 16 which bridges or superimposes the base section 12 and is maintained in spaced relation to the base section 12 by spacing pieces of sections 18 and 20, Figure 2. The plate 16 is provided with a central stud receiving aperture 22 and radial recesses 24. The diameter of the aperture 22 is such as to accommodate a shank 26 of the stud member designated generally by the numeral 28, Figure 6, and the recesses 24 are designed to accommodate cross pin projections 30. The cross pin projections 30, after insertion within the recesses 24, are adapted to engage cam surfaces 31 as the stud 28 is rotated. In Figure 6 the stud 28 is disclosed in operative association with the fastener 10, thus clamping the work part 14 and a complementary work part 14a together. The work part 14a serves to carry the stud 28.

Particular attention is directed to the manner in which the fastener 10 is secured to the work piece or cowling part 14. In this connection, it will be noted that the base section carries a pair of rivet-like welding elements or inserts 32. The base section is apertured to accommodate the welding inserts 32, as clearly illustrated in Figures 4 and 5, and is dimpled at 34. The lower half of each insert 32 is provided with a flared extremity or head 36 which nests within the confines of the dimpled area 34, and the opposite extremity of the element 32 is flared to provide a head 38. Thus these welding elements are secured as a unit to the base section 12.

Considerable difficulty has heretofore been experienced in attempting to weld together dissimilar metals. For example, it has not proven practical to weld carbon steel to stainless steel. In the drawing the fastener base 12 is made of metal which does not readily lend itself for welding directly to the work part 14. Hence, the welding inserts 32 are made of metal having structural characteristics which render them readily weldable to the surface of the metallic work part or sheet 14.

When the fastener 10 is to be secured to the plate 14 the central aperture 22 is first brought into registration with a complementary aperture 40, Figure 6, in the work part 14. It is to be noted that each rivet-like welding insert 32 is provided with a projection or protuberance 42 of limited cross section, Figure 4, and it is these protuberances which are first brought to bear against the surface of the work part 14. As previously mentioned, the metal of the welding insert and the metal of the work part 14 must be such that when welding electrodes, indicated by dot and dash lines in Figure 5, are brought to bear against the rivet head 38 on one side and the work part 14 on the other side, proper fusing of the metal will take place to insure a strong welded connection. As heretofore stated, in many instances the metal of the fastener and the metal of the work part are dissimilar and hence welding is impractical as a method of anchorage. Therefore, the present invention contemplates a fastener in which the welding inserts are dissimilar in metal composition or structural characteristics to the metallic surface on the side of the fastener base which is applied to the work part. It is not uncommon to secure carbon steel fastener devices to stainless steel work parts. This has heretofore been accomplished by riveting or by the use of some other mechanical fastening means, such as screws, but such work parts cannot be readily secured together by welding. In such instances, the present invention proposes the use of welding inserts of stainless steel. Fastener devices of the type disclosed herein, see Figure 7, are frequently plated to resist corrosion. The presence of the plating A renders it impractical to weld the device directly to a metallic work surface. In such instances, it is contemplated to employ welding elements of metal, the structural characteristics of which renders it more readily weldable to a metallic work surface than the plating material. In other words, the present invention contemplates welding inserts of the rivet type, carried as a unit by the base of a fastener part, the metal of the inserts being structurally dissimilar to that of the metallic surface of the side of the base which is normally applied to the work part.

By having one side of each welding element provided with the protuberance 42 of restricted cross sectional area the heat during welding is concentrated, thereby requiring a shorter period of heat application. As previously pointed out, fastener devices not infrequently comprise a steel member which is spring tempered, and, therefore, it is of the utmost importance to prevent, as far as possible, the transmission or conduction of excessive heat to the fastener proper. The use of protuberances 42 reduces to a minimum the possibility of overheating the spring material, such as the sheet metal base section 12. The side of the welding element oppositely disposed from the protuberance 42 is preferably provided with a conical recess or depression 44. This recess 44 serves to accommodate the extremity of a drill bit in instances where it becomes necessary to remove the fastener after it has been welded to the work part. The recesses 44 are so centered that the drill is directed centrally with respect to the aperture in the base section thereby causing the complete removal of the welding element to permit the subsequent use of rivets or other conventional fastening devices for securing a new fastener to the work part. By employing the recess 44 the drill bit is prevented from contacting the hardened material of the dimpled or countersunk area 34. In the disclosed embodiment, the dimpled area 34 constitutes a pressed countersink but in instances where the piece of heavy gauge stock, a machined countersink may be employed.

The use of the recesses 44, as well as the protuberances 42, is optional. In Figure 7 the welding insert is not provided with either the protuberance or the recess. The use of the protuberances and the recesses depends to a large extent upon the environment in which the fastener is to be employed. The presence of the plating A, as illustrated in Figure 7, introduces certain problems. The heat which would result from direct application of an electrode to the plating might cause serious impairment of the plating. Also, as previously set forth, the plating usually does not match the metal of the work for welding purposes. Under such circumstances, the presence of the plating practically prohibits satisfactory formation of a weld between the fastener and the work part.

From the foregoing, it will be understood that the present invention contemplates a fastener device which may be very conveniently welded to a metallic work surface. While the embodiment of the invention described herein comprises a sheet metal fastening device capable of being used with a cross pin type stud, it will be obvious that the invention is applicable to other fastening devices capable of being used with other types of rotary studs or screw members. Also, the headed welding inserts may be varied in structural details. The disclosed embodiment represents a solid rivet-like construction, but the use of other headed and eyelet type inserts are contemplated hereby. These various forms of fastening devices may be equipped with the welding inserts contemplated hereby which match the structural characteristics of the work part to which they are to be secured.

In other words, the invention is not limited to the specific embodiments disclosed herein, but is capable of other applications or modifications without departing from the spirit and scope of the appended claims.

The invention is hereby claimed as follows:

1. In a fastener device having a multiple part pre-assembled base assembly adapted for mounting on a metallic surface and comprising a base member having an aperture therethrough defined by an outwardly extending wall portion around the periphery of said aperture, and a solid rivet-like welding element having opposed and oppositely directed head portions with an intermediate reduced portion extending through said aperture and engaged by the free edge of said wall portion, one of said heads being disposed outwardly of said wall portion and adapted to accommodate a welding electrode, and the other of said heads being nested within and on the opposite side of said wall portion and presenting a surface adapted for flush welding attachment to the metallic surface on which the fastener device is adapted to be mounted.

2. In a fastener device having a multiple part pre-assembled base assembly, a base member having a passage therethrough defined by an outwardly extending wall portion around the periphery of said passage, said wall portion providing at the free outer edge thereof an opening of reduced size, a solid rivet-like welding element extending through the passage and having opposed oppositely directed heads with an intermediate reduced portion engaged by the edge of said wall portion, one of said heads extending outwardly of said wall portion and adapted to accommodate a welding electrode, and the other of said heads fitting within the passage defined by the inner surface of said wall portion and presenting a surface adapted for welding attachment to the metallic surface on which the fastener device is to be mounted.

3. In a fastener device having a multiple part pre-assembled base assembly adapted for mounting on a metallic surface and comprising a base member having an aperture therethrough defined by an outwardly extending frustro-conical wall portion around the periphery of said aperture, and a solid rivet-like welding element having opposed and oppositely directed head portions with an intermediate reduced portion extending through said aperture and engaged by the free edge of said wall portion, one of said heads being disposed outwardly of said wall portion and adapted to accommodate a welding electrode, and the other of said heads being frustro-conical in shape and adapted to be nested within and on the opposite side of said wall portion and presenting a surface adapted for flush welding attachment to the metallic surface on which the fastener device is adapted to be mounted.

JOHN B. O'CONNOR.